Oct. 26, 1943.    A. WEIS    2,332,879
MEANS ADAPTED TO VARY THE COUPLING OF INDUCTANCES
ESPECIALLY FOR RADIO FREQUENCY APPARATUS
Filed March 15, 1941
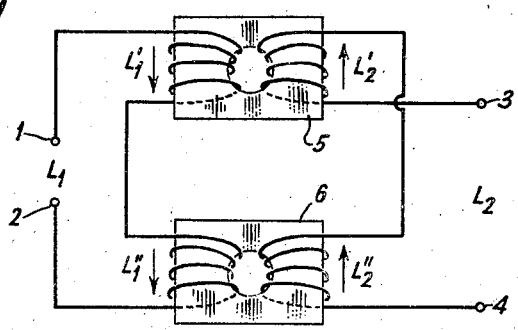
Fig.1
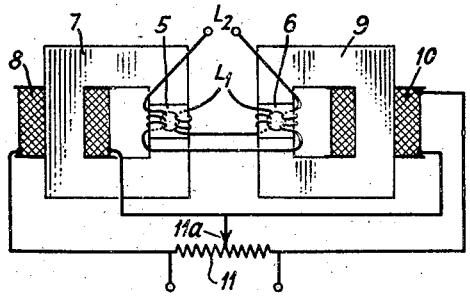
Fig.2
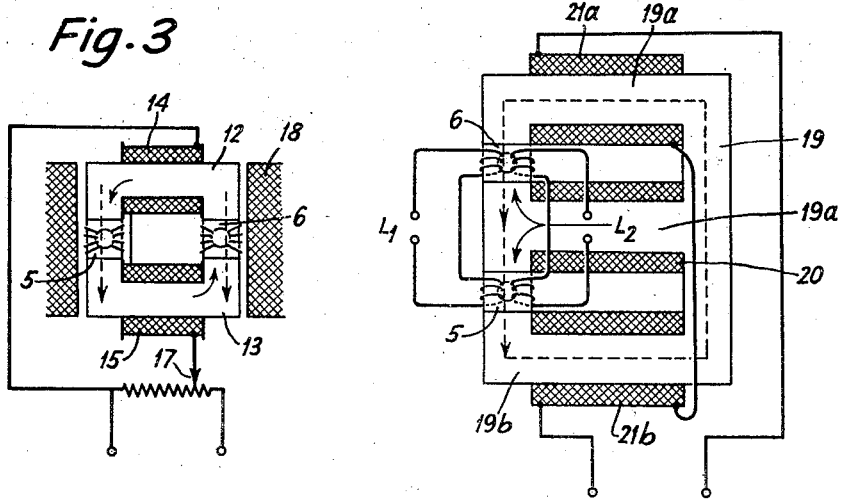
Fig.3
Fig.4
INVENTOR
ADOLF WEIS
BY
ATTORNEY Patented Oct. 26, 1943

2,332,879

UNITED STATES PATENT OFFICE 2,332,879

MEANS ADAPTED TO VARY THE COUPLING OF INDUCTANCES, ESPECIALLY FOR RADIO FREQUENCY APPARATUS

Adolf Weis, Berlin-Charlottenburg, Germany; vested in the Alien Property Custodian Application March 15, 1941, Serial No. 383,526
In Germany September 11, 1939

1 Claim. (Cl. 171—119)

This invention is concerned with an arrangement for varying the coupling between a pair of inductances, especially for radio frequency (RF) work and for remote control. For a better understanding of the invention reference shall be made to the accompanying drawing wherein Fig. 1 illustrates the basic idea of the invention and will serve to explain the same, Fig. 2 is a coupling device in accordance with the invention, and Figs. 3 and 4 are modifications of the coupling device shown in Fig. 2.

Referring first to Fig. 1 there are shown two inductances $L_1$ and $L_2$ with terminals 1, 2 and 3, 4 respectively. Each of the inductances $L_1$ and $L_2$ is divided into two seriated fractional windings $L'_1$ and $L''_1$, and $L'_2$ and $L''_2$, respectively. The fractional windings $L'_1$, $L'_2$ and $L''_1$, $L''_2$ of the inductances $L_1$ and $L_2$, the inter-coupling of which is to be altered, are respectively wound on magnetizable cores 5 and 6 which preferably are of the type known as dust-cores. The circuit arrangement of the fractional windings $L'_2$ and $L''_2$ of inductance $L_2$, with due regard to its sense of winding, is so chosen that the A. C. flowing through $L_1$ will induce potentials in the fractional windings of $L_2$ which, in the series arrangement shown in Fig. 1, are opposed to one another. Assuming like fractional windings for both inductances and like magnetic properties for both magnetic cores 5 and 6, it follows that in the fractional windings of $L_2$ equal and opposite potentials must be induced due to the fractional windings of $L_1$. These potentials therefore will cancel out in the windings of $L_2$ so that no potential difference will arise across the terminals 3 and 4. This action is equivalent to the coils $L_1$ and $L_2$ being decoupled or in balanced relation.

However, if the magnetic properties of the two magnetizable cores 5 and 6 be altered, then the voltages induced in the two fractional windings of $L_2$ will become different, and as a result a residual potential will arise across the terminals 3, 4 of $L_2$. Such a change in the properties of a magnetizable core may be effected, as well known in the prior art, for instance, by a bias magnetization of the core, say, by the aid of a distinct energizing winding, or else by means of a distinct, preferably electromagnetic, D. C. field-exciting system between the poles of which is disposed the magnetizable core bearing the A. C. windings. If the biasing magnetization of the core is raised, its permeability governing the inductance of the winding will decrease, and vice versa. By such a change in the magnetic properties of one of the cores, however, there is evidently brought about also a change in the aggregate inductance value of $L_1$ and $L_2$ conjointly with a change of coupling between the two inductances. However, these effects are avoidable according to the invention, provided that the magnetic properties of both magnetizable cores are varied by regulation of the biasing magnetization to the same extent, though in opposite sense, so that if the permeability of core 5 is raised a certain amount the permeability of core 6 will be reduced by the same amount. The inductance value of one fractional winding of one of the inductances is then raised the same amount that the inductance value of the other fractional winding of the same inductance is lowered, with the result that the aggregate inductance value of both fractional windings remains constant. This result applies to both inductances. However, notwithstanding this, the difference of the potentials in the fractional windings of the second inductance rises or falls, as the case may be, in accordance with the growing or diminishing discrepancy of the permeability values of the cores, or the coupling between the two inductances increases or decreases, as the case may be.

An arrangement such as described above involving a variation of the coupling of two windings without any alteration of the inductance of the windings, is suitable for instance in the case of band-pass filters of variable width which consist of two coupled tuning circuits, since in spite of a change in the coupling of the circuits, detuning thereof will not occur. It is possible also by the application of an arrangement as here disclosed to achieve remote control for band-width variation in band-pass filters. However, this does not exhaust the utility and applicability of the invention. Arrangements predicated for their operation upon this principle may be employed also for amplitude modulation if the exciting winding controlling the coupling of the two inductances is impressed with the modulation voltage. One practical instance, for instance, is in connection with telegraphic signal work by keying of the magnetizing currents if such an arrangement is connected between the master stage and the amplifier stage of a transmitter.

There will now be described a number of exemplified embodiments according to the invention.

Referring to Fig. 2, elements 5 and 6 denote the two magnetizable cores which carry the inductances $L_1$ and $L_2$ as disclosed in Fig. 1. Each of the two magnetizable cores 5 and 6 is disposed between the poles of a D. C. field-exciting system with regulable energization, the said system consisting of a core 7 having the winding 8 associaetd therewith and a core 9 having the winding 10 associated therewith. To regulate the energization of the windings 8 and 10 there is provided a potentiometer 11 adapted to be connected across a D. C. supply source (not shown). One end of each of the two biasing magnetizing windings 8 and 10 is connected with a respective end of the potentiometer resistance while both windings conjointly are associated with the adjustable slider 11a. If the latter is in the median position, the biasing magnetization of the two cores 5 and 6 is the same and the coupling of the two inductances $L_1$ and $L_2$, as hereinbefore explained, is zero or of minimum value. However, when the slider is shifted one way or the other, that is, in a direction towards either end of the resistance 11, the coupling between the inductances is altered. According to the direction in which the slider or tap is shifted away from the central position, there is also changed the phase position of the voltage at the second inductance governed by the coupling. Instead of a common source of voltage supply for the regulator device, it would, of course, be possible also to use distinct sources of voltage supply in conjunction with series resistances co-operating under interlocked conditions, although care must be taken in this instance to have the two sources of potential properly poled.

In Fig. 3 only one magnetic iron path is used for the exciter system which comprises the two core portions 12 and 13 between the poles of which are disposed the magnetizable cores 5 and 6 with inductances $L_1$ and $L_2$ as shown in Figs. 1 and 2. On the yokes of these two core parts are disposed the respective windings 14 and 15 which are connected in series in such a way that they cause unidirectional magnetic fluxes to pass through the magnetic energizing circuit as indicated by the solid arrows. The energization of these exciting windings is insured by the adjustable tap 17 on the potentiometer 16 which is connected across a source of D. C. voltage supply (not shown). The legs of the two core portions 12 and 13 and the interposed cores 5 and 6 are embraced by a biasing magnetizing system in the form of a winding 18. The latter sets up a constant D. C. magnetic field which has the same direction in the two legs of the magnetic energizing circuit as indicated by the dash-line arrows.

The operation of this arrangement is as follows: Magnetization by the winding 18 determines a certain equal permeability value for the two cores 5 and 6 to be subjected to control action, that is, a definite operating point for effecting zero coupling. If, then, the regulable biasing magnetization by the windings 14 and 15 becomes increasingly more effective by the shifting of the slider 17 towards the right-hand side, the biasing magnetization of the core 5 will be raised as indicated by the arrows and as a result its permeability is reduced, whereas as regards core 6 the same situation arises, only in the opposite sense, with the result that the coupling of the two inductances is raised.

In Fig. 4 there is utilized a three-limb magnetizable exciter core 19. Fitted into one of the yoke pieces of the core, upon both sides of the central limb 19c, are the two cores 5 and 6. Disposed upon the central limb is an energizing winding 20 which corresponds to the two energizing windings 14 and 15 of Fig. 3. Upon the two outer limbs 19a and 19b are windings 21a and 21b, respectively, which correspond to the winding 18 of Fig. 3. The winding 20 sets up a D. C. magnetic flux the path of which is indicated by the solid arrows; the windings 21a and 21b set up a flux which is indicated by the dash-line arrows. The energization of the windings 21a and 21b is kept constant, while that of winding 20 is regulated with a view of changing the coupling of the inductances. In the light of the explanation given with reference to Fig. 3 the regulation of the coupling of the inductances in the arrangement shown in Fig. 4 will be readily understood.

What I claim is:

In a radio frequency system, a magnetic core structure, comprising a central limb and two side limbs, a pair of coupled inductance devices, comprising a pair of magnetizable cores positioned in the magnetic circuit of said core structure at opposite sides respectively and at one end of the central limb, one of said inductance devices comprising a pair of oppositely wound series connected coils one thereof being wound around one of said cores and the other wound around the other core, the other of said inductance devices comprising a pair of uni-directionally wound series connected coils one of which is wound around one of said cores and the other around the other core, series connected coils on the outside legs of said structure adapted to be supplied with constant direct current and both coils being wound to produce an uni-directional flux in each outside leg and in each core and means for producing equal and opposite changes in the magnetization of said cores, said last named means comprising a winding on the central limb of said core structure.

ADOLF WEIS.